(12) United States Patent
Shirakawa et al.

(10) Patent No.: US 10,505,211 B2
(45) Date of Patent: Dec. 10, 2019

(54) FUEL CELL UNIT AND FUEL CELL VEHICLE

(71) Applicants: Tsutomu Shirakawa, Toyota (JP); Norishige Konno, Toyota (JP); Kazuya Mori, Nisshin (JP)

(72) Inventors: Tsutomu Shirakawa, Toyota (JP); Norishige Konno, Toyota (JP); Kazuya Mori, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 1220 days.

(21) Appl. No.: 14/381,767

(22) PCT Filed: Feb. 15, 2013

(86) PCT No.: PCT/IB2013/000196
§ 371 (c)(1),
(2) Date: Aug. 28, 2014

(87) PCT Pub. No.: WO2013/128257
PCT Pub. Date: Sep. 6, 2013

(65) Prior Publication Data
US 2015/0017563 A1 Jan. 15, 2015

(30) Foreign Application Priority Data
Mar. 1, 2012 (JP) .................... 2012-045317

(51) Int. Cl.
*H01M 8/04858* (2016.01)
*H01M 8/2465* (2016.01)
(Continued)

(52) U.S. Cl.
CPC ....... *H01M 8/04932* (2013.01); *B60L 3/0053* (2013.01); *B60L 50/71* (2019.02);
(Continued)

(58) Field of Classification Search
CPC .................................................. G01N 27/416
See application file for complete search history.

(56) References Cited

U.S. PATENT DOCUMENTS

2003/0186573 A1 10/2003 Hortop et al.
2005/0186456 A1* 8/2005 Andreas-Schott ..........................
H01M 8/0247
429/432
(Continued)

FOREIGN PATENT DOCUMENTS

EP    1411569 A2    4/2004
JP    2004536438 A  12/2004
(Continued)

OTHER PUBLICATIONS

JP2009163909A Original and Translation from Espacenet.*
(Continued)

*Primary Examiner* — Barbara L Gilliam
*Assistant Examiner* — Nathanael T Zemui
(74) *Attorney, Agent, or Firm* — Hunton Andrews Kurth LLP

(57) ABSTRACT

The invention relates to fuel cell unit arranged in an underfloor space of a fuel cell vehicle. The fuel cell unit includes a fuel cell that has a plurality of cells stacked together; and a cell monitor that is arranged in a side region of the fuel cell, and that monitors a state of each of the cells.

16 Claims, 3 Drawing Sheets

(51) Int. Cl.
    *B60L 3/00*     (2019.01)
    *B60L 50/71*     (2019.01)
    *B60L 50/72*     (2019.01)
    *H01M 8/04082*     (2016.01)
    *H01M 8/04*     (2016.01)
    *H01M 8/04298*     (2016.01)

(52) U.S. Cl.
    CPC .............. *B60L 50/72* (2019.02); *H01M 8/04* (2013.01); *H01M 8/04201* (2013.01); *H01M 8/2465* (2013.01); *H01M 8/04298* (2013.01); *H01M 2250/20* (2013.01); *Y02T 90/32* (2013.01); *Y02T 90/34* (2013.01)

(56) References Cited

U.S. PATENT DOCUMENTS

| | | | | |
|---|---|---|---|---|
| 2005/0214600 A1* | 9/2005 | Ikezoe | ................ | H01M 8/0247 324/434 |
| 2010/0065359 A1* | 3/2010 | Jufuku | .................... | B60K 1/04 180/68.5 |
| 2012/0021301 A1 | 1/2012 | Ohashi | | |
| 2013/0186573 A1 | 7/2013 | Kulesa et al. | | |

FOREIGN PATENT DOCUMENTS

| | | | | |
|---|---|---|---|---|
| JP | 2006-185868 A | | 7/2006 | |
| JP | 2008-034308 A | | 2/2008 | |
| JP | 2009-163909 A | | 7/2009 | |
| JP | 2009163909 A | * | 7/2009 | |
| JP | 2009-181939 A | | 8/2009 | |
| JP | 2010-257804 A | | 11/2010 | |
| JP | WO 2010137150 A1 | * | 12/2010 | .............. B60K 1/04 |
| WO | 03010845 A2 | | 2/2003 | |

OTHER PUBLICATIONS

Yoshimasa Enami, "Analysis of In-Plane Distribution in Polymer Electrolyte Fuel Cell", Fuji Electric Journal 75(9) (Sep. 10, 2002), published by Fuji Electric Co., Ltd., p. 525 (of a 5 page document), with partial translation of JP OA dated Jun. 21, 2017 issued to the underlying Japanese priority application, 17 pages.

* cited by examiner

FUEL CELL UNIT AND FUEL CELL VEHICLE

CROSS-REFERENCE TO RELATED APPLICATIONS

This is a national phase application based on the PCT International Patent Application No. PCT/IB2013/000196 filed Feb. 15, 2013, claiming priority to Japanese Patent Application No. 2012-045317 filed Mar. 1, 2012, the entire contents of both of which are incorporated herein by reference.

BACKGROUND OF THE INVENTION

1. Field of the Invention

The invention relates to a fuel cell unit and a fuel cell vehicle.

2. Description of Related Art

A fuel cell unit that includes a fuel cell and peripheral devices (such as a cell monitor and a control circuit and the like) is provided for use mounted in various structures such as a vehicle. When mounting the fuel cell unit in a structure, the fuel cell and the peripheral devices are typically protected from external moisture and electromagnetic waves, and electric insulation is typically realized, by housing the fuel cell unit in a predetermined case.

At present, technology has been proposed in which a protective sheet is arranged between a cable for electrically a connecting peripheral device to a fuel cell, and a case within which the fuel cell unit is housed (see Japanese Patent Application Publication No. 2009-163909 (JP 2009-1.63909 A), for example). When this kind of technology is employed, the cable is prevented from contacting the case, thus enabling damage to the cable to be inhibited.

In a fuel cell unit 100 (see FIG. 4) such as that described in JP 2009-163909 A, a cell monitor 110 is arranged above a fuel cell 120. If the cell monitor 110 is arranged above the fuel cell 120 in this way, the height dimension of the fuel cell unit 100 ends up increasing. Therefore, when arranging the fuel cell unit 100 in a space where the height dimension is limited such as in a space below a floor (hereinafter referred to as an "underfloor space") of a vehicle, for example, the height of the fuel cell 120 itself must be reduced. In order to reduce the height of the fuel cell 120 itself in this way, a power generating region of cells 121 that make up the fuel cell 120 must be reduced, and as a result, the power generating performance of the fuel cell 120 may end up decreasing.

SUMMARY OF THE INVENTION

The invention provides a fuel cell unit capable of maintaining power generating performance by ensuring a power generating region, when the fuel cell unit is arranged in an underfloor space of a fuel cell vehicle.

A first aspect of the invention relates to a fuel cell unit arranged in an underfloor space of a fuel cell vehicle. The fuel cell unit includes a fuel cell that has a plurality of cells stacked together, and a cell monitor that is arranged in a side region of the fuel cell stack, and that monitors a state of each of the cells.

With this kind of structure, the cell monitor is arranged in a side region of the fuel cell (i.e., a region between a virtual plane that contacts an uppermost portion in a height direction of the fuel cell stack, and a virtual plane that contacts a lowermost portion in the height direction of the fuel cell stack). As a result, when arranging the fuel cell in an underfloor space of a fuel cell vehicle, the dimension of the underfloor space in the height direction is able to be occupied to the greatest extent possible by the fuel cell stack. Therefore, even if the height dimension of the underfloor space of the fuel cell vehicle is limited, the power generating region of the cells that make up the fuel cell is able to be ensured, so the power generating performance of the fuel cell is able to be maintained. When a fuel cell that has a generally rectangular parallelepiped shape with four side surfaces is employed, the cell monitor may be arranged on at least one of the side surfaces of the fuel cell stack.

The stacking direction of the cells may be in a generally horizontal direction. In this case, the cell monitor may be arranged on a surface that extends parallel to the stacking direction of the cells, from among the four side surfaces of the fuel cell in which the cells are stacked, and a connector of each fuel cell cell may be arranged on a surface, excluding both of the end plate-side surfaces, from among the four side surfaces of the fuel cell stack.

With this kind of structure, the length of the cables that connect connectors of the cell monitor to the connectors of the cells is able to be shortened.

Also, the cell monitor may have at least one surface that extends generally parallel to the stacking direction of the cells. Also, the connectors of the cell monitor may be arranged on the surface that is positioned nearest the connectors of the cells, from among the surfaces of the cell monitor.

The connectors of the cell monitor may be lined up in the same direction as the connectors of the cells.

According to this structure, the cables that electrically connect the connectors of the cell monitor to the connectors of the cells do not need to be bent excessively.

Also, when the cell monitor has at least one surface that extends generally parallel to the stacking direction of the cells, the connectors of the cell monitor may be arranged on the surface on a vertically lower side, from among the surfaces of the cell monitor. At this time, the connectors of the cells may be arranged in a vertically lower region of the stacking surface of the fuel cell stack.

According to this structure, the connectors of the cell monitor are arranged on the surface that is on the vertical lower side, so even if dew condensation water drips down from above the cell monitor, the connectors of the cell monitor will not easily come into contact with the dew condensation water. Therefore, there is no need to provide a drip-proofing protector or the like, or use water-proof connectors, so an increase in the number of parts can be suppressed, which enables the unit to be less expensive. In addition, an increase in size of the unit due to an increase in the number of parts is able to be inhibited.

Also, the fuel cell may have a through-hole for discharging reaction gas for generating power. In this case, at least one of the connectors of the cells may be arranged near the through-hole.

According to this structure, a portion where voltage tends to drop can be monitored. Accordingly, a drop in voltage of the cells is able to be quickly detected.

Also, a second aspect of the invention relates to a fuel cell vehicle provided with the fuel cell unit described above. The fuel cell unit is arranged in an underfloor space.

The invention thus makes it possible to maintain power generating performance by ensuring a power generating region, when arranging a fuel cell unit in an underfloor space of a fuel cell vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
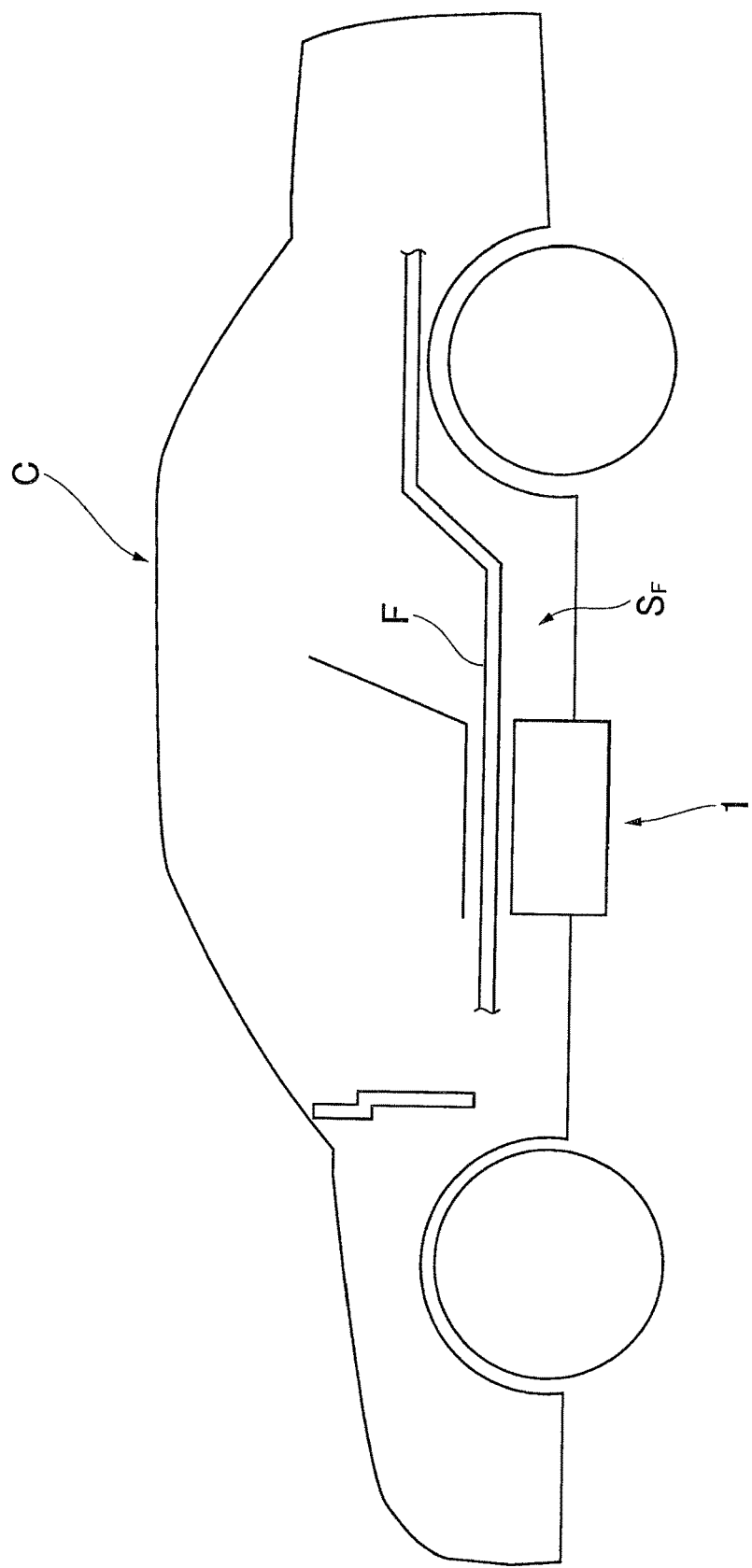
FIG. 1 is a side view of a fuel cell vehicle provided with a fuel cell unit according to one example embodiment of the invention.

Hereinafter, example embodiments of the invention will be described with reference to the accompanying drawings. In the example embodiments, an example is described in which the invention is applied to a fuel cell unit 1 arranged in a space $S_F$ below a floor F of a fuel cell vehicle C (hereinafter this space will be referred to as "underfloor space $S_F$"), as shown in FIG. 1.

Figure 2:
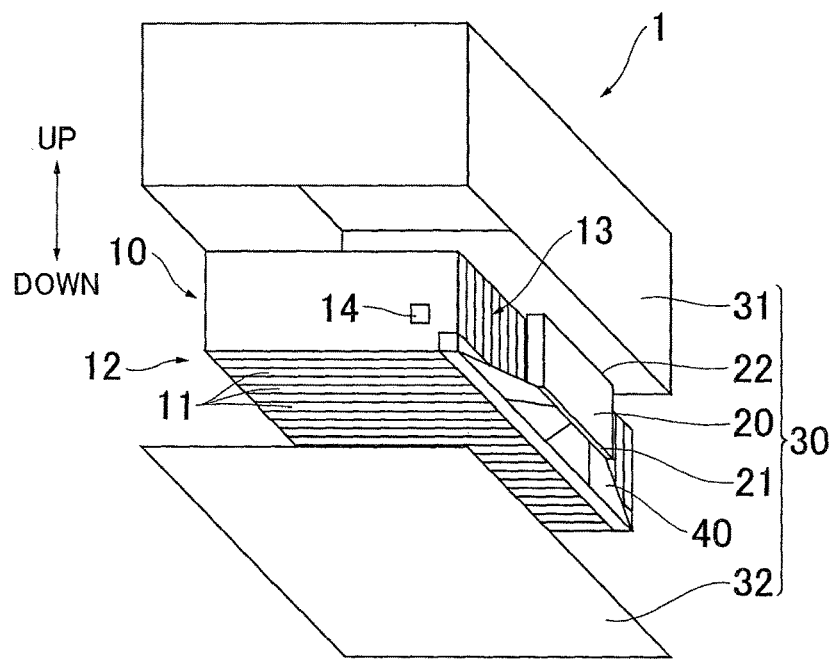
FIG. 2 is an exploded perspective view of the fuel cell unit according to the example embodiment of the invention.

As shown in FIG. 2, the fuel cell unit 1 according to this example embodiment includes a fuel cell 10 that has a plurality of cells (single cells) 11 that are stacked together, a cell monitor 20 for monitoring the state of each fuel cell cell 11, and a fuel cell case 30 within which the fuel cell 10 and the cell monitor 20 are housed.

The fuel cell 10 has a stacked body formed by a plurality of plate-like cells 11, each of which has a generally rectangular shape when viewed from above and is formed by a membrane electrode assembly and a separator, and two end plates, not shown, one arranged on each end of the stacked body in the cell stacking direction. A generally rectangular parallelepiped fuel cell stack 12 having four side surfaces is formed by arranging the end plates so that one is on each side of the stacked body (such that the stacked body is sandwiched by the two end plates), applying compression force in the cell stacking direction, and fixing tension plates, not shown, that extend in the cell stacking direction on the outside of the stacked body to both of the end plates. The fuel cell 10 is arranged in the underfloor space $S_F$ while housed in the case 30 such that the stacking direction of the cells 11 is generally a horizontal direction (i.e., a vehicle width direction of the fuel cell vehicle C). In this example embodiment, one row of the fuel cell stack 12 is employed, but two or more rows of fuel cell stacks 12 may also be arranged lined up.

Figure 3:
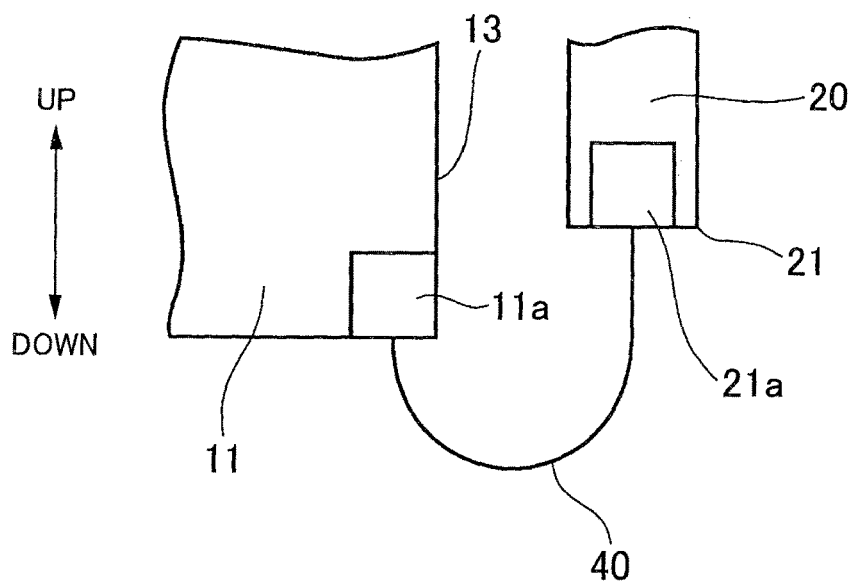
FIG. 3 is an enlarged view of a portion of the fuel cell unit according to the example embodiment of the invention, which is near a connector.

Each of the cells 11 has a connector 11a for connecting a cable, as shown in FIG. 3. The connector 11a of each fuel cell cell 11 is electrically connected to a connector 21 of the cell monitor 20 via a cable 40. The connector 11a of each fuel cell cell 11 is arranged on an end portion on the cell monitor 20 side of a vertically lower surface of the fuel cell stack 12 (i.e. a lower surface of the fuel cell stack 12 in a vertical direction), as shown in FIGS. 2 and 3. Also, the fuel cell 10 has a through-hole 14 for discharging reaction gas (fuel gas and oxidizing gas) for generating power. The connectors 11a of the cells 11 that are arranged on the end portion in the cell stacking direction are arranged near this through-hole 14.

The cell monitor 20 is an electronic device for monitoring a state (e.g., voltage, current, temperature and the like) of each fuel cell cell 11. As shown in FIGS. 2 and 3, the cell monitor 20 is arranged in a side region of the fuel cell 10. Here, the side region of the fuel cell 10 refers to a region between a virtual plane that contacts an uppermost portion in a height direction of the fuel cell 10, and a virtual plane that contacts a lowermost portion in the height direction of the fuel cell 10. Arranging the cell monitor 20 in the side region instead of above the fuel cell 10 enables the dimension of the underfloor space $S_F$ in the height direction to be occupied to the greatest extent possible by the fuel cell 10. Therefore, the power generating region of the cells 11 is able to be ensured, so the power generating performance of the fuel cell 10 is able to be maintained.

In this example embodiment, the cell monitor 20 is arranged on a side surface 13 (one example of the side region of the fuel cell 10) of the fuel cell stack 12. Here, the side surface 13 is a surface excluding the surfaces on both end plate-sides of the fuel cell stack, and the upper and lower surfaces of the fuel cell stack in the vertical direction. In this example embodiment, the cells 11 are, stacked in the vehicle width direction of the fuel cell vehicle C, so the side surface 13 of the fuel cell stack 12 is formed on a vehicle front side and a vehicle rear side of the fuel cell vehicle C. The cell monitor 20 may be arranged on either one of these two side surfaces 13. The cell monitor 20 may be closely contacting the side surface 13 of the fuel cell stack 12, or may be arranged slightly separated from the side surface 13.

The cell monitor 20 has two side surfaces (a lower surface 21 and an upper surface 22) that extend generally parallel to the stacking direction of the cells 11 (i.e., a generally horizontal direction), as shown in FIGS. 2 and 3. Also, as shown in FIG. 3, connectors 21a are arranged on a vertically lower side surface (i.e., the lower surface 21) that is in a position closest to the connectors 11a of the cells 11. The connectors 21a of the cell monitor 20 are arranged facing downward on the lower surface 21 of the cell monitor 20 in this way, so the connectors 21a will not easily come in contact with dew condensation water even if dew condensation water drips down from above the cell monitor 20.

The fuel cell case 30 is formed, in a generally rectangular parallelepiped shape, by an upper case 31 arranged on an upper side, and a lower cover 32 that is attached to a lower open portion of the upper case 31, as shown in FIG. 2. This fuel cell case 30 has good electromagnetic shielding, airtightness, and liquid-tightness. The fuel cell case 30 is fixed by a fixing member, not shown, in a state arranged in the underfloor space $S_F$.

In the fuel cell unit 1 according to the example embodiment described above, the cell monitor 20 is arranged in the side region (i.e., the side surface 13 of the fuel cell stack 12) of the fuel cell 10, so when arranging the fuel cell 10 in the underfloor space $S_F$ of the fuel cell vehicle C, the dimension of the underfloor space $S_F$ in the height direction is able to be occupied to the greatest extent possible by the fuel cell 10. Therefore, even if the fuel cell 10 is arranged in the underfloor space $S_F$ that has a limited height dimension, the power generating region of the cells 11 that make up the fuel cell 10 is able to be ensured, so the power generating performance of the fuel cell 10 is able to be maintained.

Figure 4:
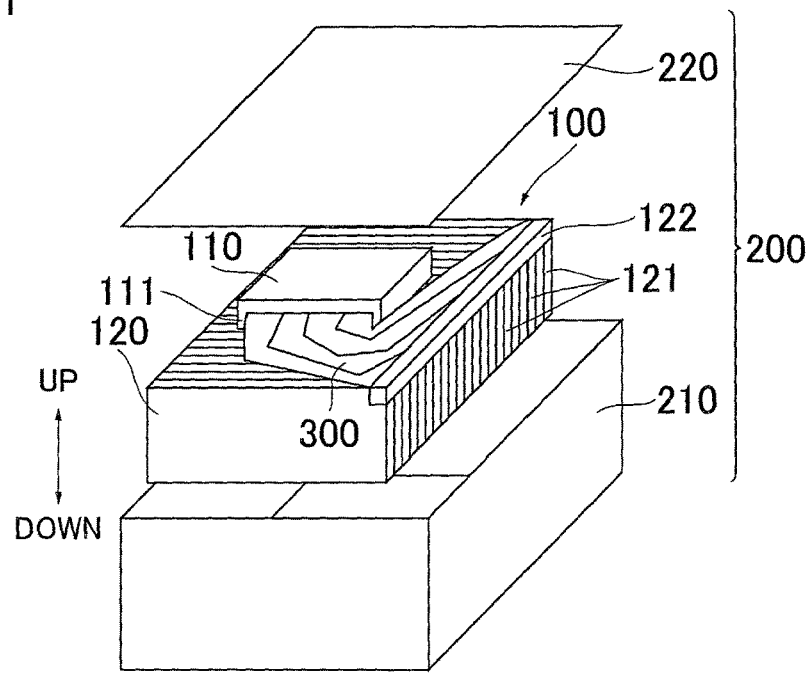
FIG. 4 is an exploded perspective view of a fuel cell unit according to related art.

Conventionally, the direction in which connectors 111 of a cell monitor 110 are lined up may be orthogonal to the direction in which connectors 122 of cells 121 that make up a fuel cell 120 are lined up, as shown in FIG. 4. In this case, cables 300 that connect the connectors together must be extended and bent, and assembly work is difficult.

Figure 5:
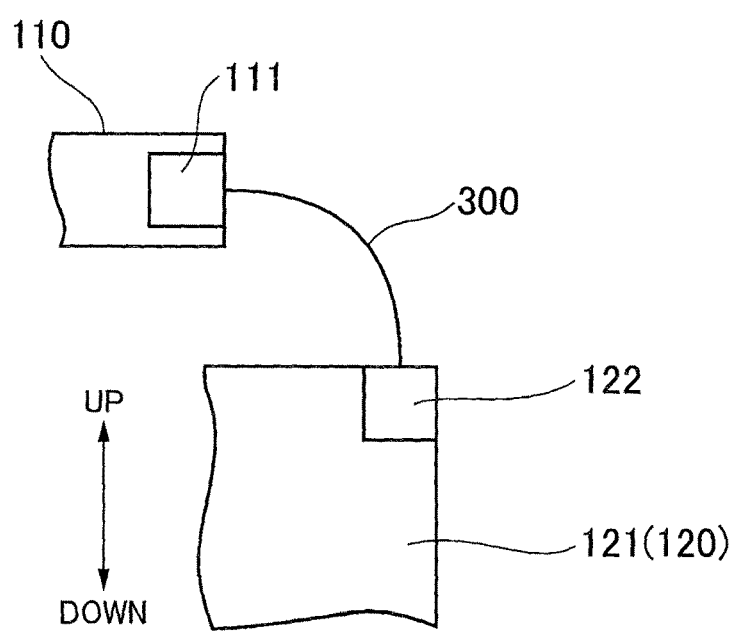
FIG. 5 is an enlarged view of a portion of the fuel cell unit according to the related art, which is near a connector.

Also, conventionally, the cell monitor 110 is arranged above the fuel cell 120, so the connectors 111 of the cell monitor 110 are exposed to the side, as shown in FIG. 5. Thus, dew condensation water produced inside a fuel cell housing case 200 (a case 210 and an upper cover 220) like that shown in FIG. 4 may end up dripping down and contacting the connectors 111 of the cell monitor 110. Therefore, there is a need to employ a drip-proof protector or water-proof connectors, so the number of parts will increase, which increases the size of the unit as well as increases the cost and the like.

In contrast, in the fuel cell unit 1 according to the example embodiment described above, the cell monitor 20 is arranged on the side surface 13 of the fuel cell stack 12, and the connectors 11a of the cells 11 are arranged on the vertically lower surface of the fuel cell stack 12. As a result, the length of the cables 40 that connect the connectors 21a of the cell monitor 20 to the connectors 11a of the cells 11 is able to be made shorter. Also, in the fuel cell unit 1, the connectors 21a of the cell monitor 20 extend generally parallel to the stacking direction of the cells 11, and are arranged on the lower surface 21 that is in a position nearest the connectors 11a of the cells 11. The connectors 21a of the cell monitor 21 are lined up in the same direction as the connectors 11a of the cells 11. Therefore, the cables 40 that electrically connect the connectors 21a of the cell monitor 20 to the connectors 11a of the cells 11 do not need to be bent excessively.

Also, in the fuel cell unit 1 according to the example embodiment described above, the connectors 21a of the cell monitor 20 are arranged on the vertically lower side surface (i.e., the lower surface 21), so even in a situation in which dew condensation water were to drip down from above the cell monitor 20, the connectors 21a of the cell monitor 20 would not easily come into contact with the dew condensation water. Therefore, there is no need to provide a drip-proofing protector or the like, or use water-proof connectors, so an increase in the number of parts can be suppressed, which enables the unit to be less expensive. In addition, an increase in size of the unit due to an increase in the number of parts is able to be inhibited.

Also, in the fuel cell unit 1 according to the example embodiment described above, the connectors 11a of the cells 11 are arranged near the through-hole 14 for discharging the reaction gas for generating power, so a portion where voltage tends to drop can be monitored. Accordingly, a drop in voltage of the cells 11 is able to be quickly detected.

Also, in the example embodiment described above, an example is described in which the fuel cell stack 12 (i.e., the fuel cell 10) that has a generally rectangular parallelepiped shape is formed by the plurality of plate-like cells 11 that have a generally rectangular shape when viewed from above being stacked together. However, the shape of the cells 11 and the shape of the fuel cell stack 12 (i.e., the fuel cell 10) are not limited to this. Also, in the example embodiment described above, the cells 11 are stacked together in the vehicle width direction of the fuel cell vehicle C. Alternatively, however, the cells 11 may also be stacked together in a vehicle longitudinal direction of the fuel cell vehicle C. In the example embodiment described above, the connectors 11a of the cells 11 are provided on a vertically lower surface of the fuel cell stack 12, but they may also be provided on the side surface 13. In this case, bending of the cables 40 is able to be avoided to an even greater extent, so the distance between the connectors 11a of the cells 11 and the connectors 21a of the cell monitor 20 is also able to be even shorter. Further, a case in which the cables 40 are arranged in a region below the fuel cell stack 12 is able to be avoided, so the space above and below the fuel cell stack 12 is able to be used efficiently. In this case, the connectors 21a of the cell monitor 20 are provided on the lower side surface, so if the connectors 11a are provided on the lower end portion of the side surface 13, the length of the cables 40 is able to be shorter. However, in order to prevent water from dew condensation from contacting the connector 11a, it is preferable to provide the connectors 11a on the vertically lower side of the fuel cell stack 12 as shown in FIG. 3.

The invention is not limited to the foregoing example embodiments. That is, appropriate design changes to the example embodiments by one skilled in the art are also included within the scope of the invention as long as the characteristic of the invention is provided. That is, the elements of the example embodiments described above, as well as the arrangement, material, conditions, shapes, and sizes and the like thereof are not limited to those illustrated, but may be modified as appropriate. Also, the elements of the example embodiments described above may be combined if technically possible, and these combinations are also included within the scope of the invention as long as they include the characteristic of the invention.

The invention claimed is:

1. A fuel cell vehicle, comprising:
 a fuel cell unit arranged in an underfloor space of the fuel cell vehicle, the fuel cell unit includes:
 a fuel cell that has a plurality of cells stacked together in a generally horizontal direction, the plurality of cells each including at least one first connector; and
 a cell monitor that is arranged in a side region of the fuel cell, and that monitors a state of each of the plurality of cells, and the cell monitor includes second connectors corresponding to each of the at least one first connector of each of the plurality of cells,
 wherein the second connectors of the cell monitor being arranged facing downward on a surface on a vertically lower side of the cell monitor,
 wherein the vertically lower side of the cell monitor being positioned vertically lower than other sides of the cell monitor,
 wherein the surface on the vertically lower side of the cell monitor extending generally parallel to a stacking direction of the plurality of cells, and
 wherein the fuel cell has a through-hole for discharging reaction gas for generating power and at least one of the at least one first connector of each of the plurality of cells is arranged near the through-hole, the through-hole is arranged below the center of the fuel cell in the vertical direction and arranged on the cell monitor side in the horizontal direction of the fuel cell.

2. The fuel cell vehicle according to claim 1, wherein the fuel cell has a generally rectangular parallelepiped shape with four side surfaces; and the cell monitor is arranged on at least one of the side surfaces of the fuel cell.

3. The fuel cell vehicle according to claim 2, wherein the cell monitor is arranged on the side surface that extends parallel to a stacking direction of the cells from among the four side surfaces of the fuel cell; and a first connector of each cell is arranged on the side surface, excluding both end plate-side surfaces, from among the four side surfaces of the fuel cell.

4. The fuel cell vehicle according to claim 3, wherein the first connectors of the cells are arranged in a vertically lower region of the fuel cell.

5. The fuel cell vehicle according to claim 4, wherein the first connectors of the cells are arranged on a lower surface, from among the surfaces of the fuel cell.

6. The fuel cell vehicle according to claim 5, wherein the first connectors of the cells are arranged on an end portion, on a cell monitor side, of the lower surface of the fuel cell.

7. The fuel cell vehicle according to claim 3, wherein the cell monitor has at least one surface that extends generally parallel to the stacking direction of the cells, and second connectors of the cell monitor are arranged on the surface that is positioned nearest the first connectors of the cells.

8. The fuel cell vehicle according to claim 3, wherein the cell monitor has at least one surface that extends generally parallel to the stacking direction of the cells, and second connectors of the cell monitor are arranged on the surface on a vertically lower side, from among the surfaces of the cell monitor.

9. The fuel cell vehicle according to claim 7, wherein the second connectors of the cell monitor are lined up in the same direction as the first connectors of the cells.

10. The fuel cell vehicle according to claim 7, further comprising cables that connect the first connectors of the cells to the second connectors of the cell monitor.

11. The fuel cell vehicle according to claim 1, wherein the cells are stacked in a vehicle width direction.

12. The fuel cell vehicle according to claim 8, wherein the second connectors of the cell monitor are lined up in the same direction as the first connectors of the cells.

13. The fuel cell vehicle according to claim 8, further comprising cables that connect the first connectors of the cells to the second connectors of the cell monitor.

14. The fuel cell vehicle according to claim 1, further comprising cables that connect first connectors of the cells to second connectors of the cell monitor,
wherein first connection portions of the cables and the first connectors of the cells are arranged on a lower surface, from among surfaces of the fuel cell.

15. The fuel cell vehicle according to claim 1, further comprising cables that connect first connectors of the cells to second connectors of the cell monitor,
wherein second connection portions of the cables and the second connectors of the cell monitor are arranged on a lower surface, from among the surfaces of the cell monitor.

16. The fuel cell vehicle according to claim 1, further comprising cables that connect first connectors of the cells to second connectors of the cell monitor,
wherein first connection portions of the cables and the first connectors of the cells are arranged on a lower surface, from among the surfaces of the fuel cell, and
second connection portions of the cables and the second connectors of the cell monitor are arranged on a lower surface, from among surfaces of the cell monitor.

\* \* \* \* \*